(12) United States Patent
Hoang et al.

(10) Patent No.: US 12,151,198 B2
(45) Date of Patent: *Nov. 26, 2024

(54) MATERIALS, METHODS, AND DEVICES FOR SILOXANE CONTAMINANT REMOVAL

(71) Applicant: Donaldson Company, Inc., Bloomington, MN (US)

(72) Inventors: Brian N. Hoang, Shakopee, MN (US); Gerald Weineck, St. Paul, MN (US); Karthik Viswanathan, Minneapolis, MN (US); Andrew J. Dallas, Lakeville, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/137,739

(22) Filed: Apr. 21, 2023

(65) Prior Publication Data

US 2023/0264135 A1    Aug. 24, 2023

Related U.S. Application Data

(60) Division of application No. 16/888,688, filed on May 30, 2020, now Pat. No. 11,648,501, which is a
(Continued)

(51) Int. Cl.
*B01D 53/02* (2006.01)
*B01D 53/04* (2006.01)
(Continued)

(52) U.S. Cl.
CPC ............ *B01D 53/04* (2013.01); *B01D 53/02* (2013.01); *B01J 20/08* (2013.01); *B01J 20/103* (2013.01);
(Continued)

(58) Field of Classification Search
CPC ........ B01D 2253/102; B01D 2253/104; B01D 2253/106; B01D 2253/108;
(Continued)

(56) References Cited

U.S. PATENT DOCUMENTS 2,015,593 A   9/1935   Derr
4,014,817 A   3/1977   Johnson et al.
(Continued)

FOREIGN PATENT DOCUMENTS

CN   1878604    12/2006
CN   101502738   8/2009
(Continued)

OTHER PUBLICATIONS

Chinese Patent Application No. 2013800299939, "Decision on Rejection", mailed Jan. 20, 2017, 19 pages. With English translation.
(Continued)

*Primary Examiner* — Christopher P Jones
(74) *Attorney, Agent, or Firm* — Mueting Raasch Group

(57) ABSTRACT

Adsorbent materials are disclosed, along with filter elements containing the adsorbent materials methods of using adsorbents to remove siloxane contaminants from a gas stream. The method includes providing an adsorbent material that has been washed with an acid and passing a gas through the adsorbent material so as to reduce siloxane levels in the gas. A filter element for reducing siloxane levels in a gas includes a first adsorbent material, the first adsorbent material comprising an acid-washed adsorbent; and a second adsorbent material, the second adsorbent material comprising an acid-impregnated adsorbent.

9 Claims, 8 Drawing Sheets

Related U.S. Application Data continuation of application No. 16/179,145, filed on Nov. 2, 2018, now Pat. No. 10,688,433, which is a continuation of application No. 15/724,498, filed on Oct. 4, 2017, now Pat. No. 10,130,905, which is a continuation of application No. 14/399,480, filed as application No. PCT/US2013/032463 on Mar. 15, 2013, now Pat. No. 9,789,435.

(60) Provisional application No. 61/643,732, filed on May 7, 2012.

(51) Int. Cl.
| | | |
|---|---|---|
| *B01J 20/08* | (2006.01) | |
| *B01J 20/10* | (2006.01) | |
| *B01J 20/18* | (2006.01) | |
| *B01J 20/20* | (2006.01) | |
| *B01J 20/22* | (2006.01) | |
| *B01J 20/28* | (2006.01) | |

(52) U.S. Cl.
CPC ............ *B01J 20/186* (2013.01); *B01J 20/20* (2013.01); *B01J 20/22* (2013.01); *B01J 20/28052* (2013.01); *B01D 2253/102* (2013.01); *B01D 2253/104* (2013.01); *B01D 2253/106* (2013.01); *B01D 2253/108* (2013.01); *B01D 2253/25* (2013.01); *B01D 2257/55* (2013.01); *B01D 2257/556* (2013.01); *B01D 2258/0216* (2013.01); *B01D 2258/06* (2013.01)

(58) Field of Classification Search
CPC ............ B01D 2253/25; B01D 2257/55; B01D 2257/556; B01D 2258/0216; B01D 2258/06; B01D 53/02; B01D 53/04; B01J 20/08; B01J 20/103; B01J 20/186; B01J 20/20; B01J 20/22; B01J 20/28052
See application file for complete search history.

(56) References Cited

U.S. PATENT DOCUMENTS

| | | | |
|---|---|---|---|
| 4,083,801 | A | 4/1978 | Das |
| 5,607,647 | A | 3/1997 | Kinkead |
| 5,626,820 | A | 5/1997 | Kinkead et al. |
| 5,900,532 | A | 5/1999 | Ikeda et al. |
| 5,985,790 | A | 11/1999 | Moskovitz et al. |
| 6,146,451 | A | 11/2000 | Sakata et al. |
| 6,196,050 | B1 | 3/2001 | Ikeda et al. |
| 6,352,578 | B1 | 3/2002 | Sakata et al. |
| 7,132,011 | B2 | 11/2006 | Shellhammer et al. |
| 7,377,982 | B2 | 5/2008 | Alvarez, Jr. et al. |
| 9,789,435 | B2 | 10/2017 | Hoang et al. |
| 10,130,905 | B2 | 11/2018 | Hoang et al. |
| 10,688,433 | B2 | 6/2020 | Hoang et al. |
| 11,648,501 | B2 | 5/2023 | Hoang et al. |
| 2002/0170815 | A1 | 11/2002 | Fujii |
| 2003/0041733 | A1 | 3/2003 | Seguin et al. |
| 2005/0045039 | A1 | 3/2005 | Shellhammer et al. |
| 2005/0092176 | A1 | 5/2005 | Ding et al. |
| 2006/0000352 | A1 | 1/2006 | Tower et al. |
| 2007/0068386 | A1 | 3/2007 | Mitariten |
| 2011/0052462 | A1 | 3/2011 | Schmidt et al. |
| 2011/0112335 | A1 | 5/2011 | Godavarthy et al. |
| 2012/0021123 | A1 | 1/2012 | Leveson et al. |
| 2015/0118137 | A1 | 4/2015 | Hoang et al. |
| 2018/0028960 | A1 | 2/2018 | Hoang et al. |
| 2019/0070552 | A1 | 3/2019 | Hoang et al. |
| 2020/0324243 | A1 | 10/2020 | Hoang et al. |

FOREIGN PATENT DOCUMENTS

| | | |
|---|---|---|
| GB | 1 061 847 | 3/1967 |
| JP | 1992-0312785 | 5/1994 |
| JP | H06-135708 | 5/1994 |
| JP | H11-290636 | 10/1999 |
| JP | 2000-157826 | 6/2000 |
| JP | 2001-310109 | 11/2001 |
| JP | 2002-052338 | 2/2002 |
| JP | 2005-506898 | 3/2005 |
| JP | 2008-045060 | 2/2008 |
| JP | 2008-055318 | 3/2008 |
| JP | 2010-259983 | 11/2010 |
| JP | 2011-212531 | 10/2011 |
| KR | 10-1998-0073620 | 11/1998 |
| WO | 2005/021134 | 3/2005 |
| WO | 2008/024329 | 2/2008 |
| WO | 2011/099616 | 8/2011 |
| WO | 2013/169392 | 11/2013 |

OTHER PUBLICATIONS

Chinese Patent Application No. 2013800299939, "First Office Action", mailed Sep. 29, 2015, 15 pages. With English translation.
European Patent Application No. 13714434.1, "Communication Pursuant to Rules 161(1) and 162 EPC", mailed Jan. 12, 2015, 2 pages.
International Patent Application No. PCT/US2013/032463, filed Mar. 15, 2013, PCT International Search Report and Written Opinion issued Aug. 16, 2013, 15 pages.
International Patent Application No. PCT/US2013/032463, filed Mar. 15, 2013, PCT International Preliminary Report on Patentability, issued Nov. 20, 2014, 10 pages.
Japanese Patent Application No. 2015-511467, "Office Action", mailed Jan. 27, 2017, 10 pages. With English translation.
Japanese Patent Application No. 2015-511467, "Third Party Observation with translation", 5 pages.
Park, et al., "Manufacture of Iron, Copper and Silver Ions Impregnated Activated Carbon", Apr. 2006, J of KSEE, 28(4):384-388. English translation provided of abstract, table, and figures only.
Seguin, et al., "Rationalizing the Mechanism of HMDS Degradation in Air and Effective Control of the Reaction Byproducts", Mar. 24, 2008, SPIE The International Society for Optics and Photonics, 12 pages. Available online at http://proceedings.spiedigitallibrary.org/proceeding.aspx?articleid=831263&resultClick=1.

MATERIALS, METHODS, AND DEVICES FOR SILOXANE CONTAMINANT REMOVAL

This application is a divisional application of U.S. patent application Ser. No. 16/888,688, filed May 30, 2020, which is a continuation application of U.S. patent application Ser. No. 16/179,145, filed Nov. 2, 2018, now U.S. Pat. No. 10,688,433, which is a continuation application of U.S. patent application Ser. No. 15/724,498, filed Oct. 4, 2017, now U.S. Pat. No. 10,130,905, which is a continuation application of U.S. patent application Ser. No. 14/399,480, filed Nov. 6, 2014, now U.S. Pat. No. 9,789,435, which is the § 371 U.S. National Stage of International Application No. PCT/US2013/032463, filed Mar. 15, 2013, which claims priority to U.S. Provisional Patent Application No. 61/643,732, filed May 7, 2012, the disclosures of each of which are hereby incorporated by reference herein in their entireties.

FIELD OF THE INVENTION

The current technology relates to adsorbent materials.

BACKGROUND

Siloxane compounds, such as hexamethyldisiloxane, hexamethylcyclotrisiloxane, and trimethylsilanol are contaminants that can interfere with many advanced manufacturing processes. For example, siloxane compounds can seriously damage equipment used in manufacturing of electronic components, such as photolithography equipment, including lenses and optical components. Removal of siloxane compounds from ambient air, tool environments and point of use air streams is critical to avoid damaging such equipment and components. Therefore, a need exists for methods and materials that can reliably remove siloxane compounds from gases.

SUMMARY OF THE INVENTION

The present invention is directed, in part, to methods and materials for reducing siloxane contaminants in gases. Other contaminants, such as ammonia and acid gases are optionally also reduced along with siloxanes. The methods comprise, in certain embodiments, utilization of an adsorbent material that has been washed with an acid. When siloxane-containing gases are passed through the acid washed adsorbent, the siloxane levels in the gas are reduced.

Suitable adsorbent materials include activated carbon, as well as (for example) silica gel, activated alumina, zeolites, nanoporous supports, and combinations thereof. Typically the adsorbent is washed with a strong acid, such as nitric acid. After being treated with the strong acid, the adsorbent is generally washed with water to remove excess acid and return the adsorbent material to a more neutral pH (although the adsorbent surface still generally has a slightly acidic pH).

The methods and media can be used to remove siloxane contaminants from ambient air, as well as from clean dry air (CDA), from nitrogen gas, from rare gases, and from other gases that may contain undesirable siloxane levels. The removal of siloxanes, even siloxanes at very low concentrations, can also be beneficial in various microelectronics manufacturing and operational processes, such as production of flat panel displays, the production and operation of photonics devices, and the production and operation of photovoltaic cells. The removal of siloxanes is often particularly important to semiconductor manufacturing, such as in photolithography processes.

In addition to the use of an acid washed adsorbent for the removal of siloxanes, other adsorbent materials can be used in conjunction with the acid washed adsorbent to either further remove siloxanes, to remove other contaminants, or to remove siloxanes as well as other contaminants. The additional adsorbent material can also include activated carbon, as well as (for example) silica gel, activated alumina, zeolites, nanoporous supports, and combinations thereof. In one implementation the additional adsorbent is impregnated with an acid, such as a strong acid. Suitable acids include, for example, phosphoric acid and citric acid. These acid impregnated adsorbents are particularly suitable for removal of basic contaminants, such as ammonia.

Typically the two adsorbents (such as an acid washed adsorbent in which most acid is removed, and an acid impregnated adsorbent in which significant amounts of acid remain impregnated on the media) are arranged in a filter element so that gases sequentially flow through the different adsorbents. Thus, for example, in a packed-bed filter, there may be one packed bed for a first adsorbent, and second packed bed for the second adsorbent.

Besides the above-mentioned acid washed adsorbent for siloxane removal, and the acid impregnated adsorbent for removal of bases, other materials can be incorporated for removing other contaminants. These materials include an acid gas remover (AGR) that may comprise adsorbent impregnated with potassium iodide (KI) or potassium carbonate ($K_2CO_3$) or sodium hydroxide (NaOH). This acid gas remover can also further remove siloxanes in some implementations. When combining the acid gas remover with acid washed adsorbent, the ratio of acid washed adsorbent to acid gas remover is in some embodiments from 2:1 to 1:2; or alternatively from 3:1 to 1:3; and alternatively from 10:1 to 1:10.

The invention is also directed to filter elements for reducing siloxane levels in a gas, the filter element comprising at least two adsorbents. In some embodiments the first adsorbent material comprises an acid-washed adsorbent; and the second adsorbent material comprises an acid-impregnated adsorbent.

When acid treatment is used to modify the surface of the adsorbent to create an acid washed adsorbent, generally the acid treatment comprises treating the adsorbent material or substrate with a strong acid, often with an aqueous acid solution that is at least 5 percent by weight acid, more typically an aqueous acid solution that is at least 10 percent strong acid by weight. In certain implementations the acid treatment comprises treatment of the substrate in an acid solution that is at least 35 percent acid, and optionally a solution that is at least 70 percent acid. In some embodiments the acid solution comprises from 5 to 85 percent acid, in others the acid solution comprises from 20 to 75 percent acid, and yet others the acid solution comprises from 30 to 60 percent acid. Note that even greater than 85 percent acid can be added, typically by use of acid fumes or vapors.

A particularly suitable acid used for acid washing is nitric acid. In some implementations the aqueous acid solution comprises nitric acid, optionally at least 5 percent nitric acid, more typically at least 10 percent nitric acid. In certain implementations the acid solution comprises at least 35 percent nitric acid, and optionally at least 70 percent nitric acid. In some embodiments the acid solution comprises from 5 to 85 percent nitric acid, in others the acid treatment comprises from 20 to 75 percent nitric acid, and in yet others the acid solution comprises from 30 to 60 percent nitric acid.

After acid treatment the adsorbent is generally rinsed one or more times with water, generally purified water, to remove most of the remaining acid from the adsorbent. In at least one embodiment, the pH of the washed material is between 4 and 5, in others the pH is from 3.5 to 6.5; and in yet other implementations the pH is from 3 to 7, while in other implementations the pH is from 2 to 8.

The above summary of the present invention is not intended to describe each discussed embodiment of the present invention. This is the purpose of the figures and the detailed description that follows.

FIGURES

The invention may be more completely understood in connection with the following drawings, in which.

Figure 1:
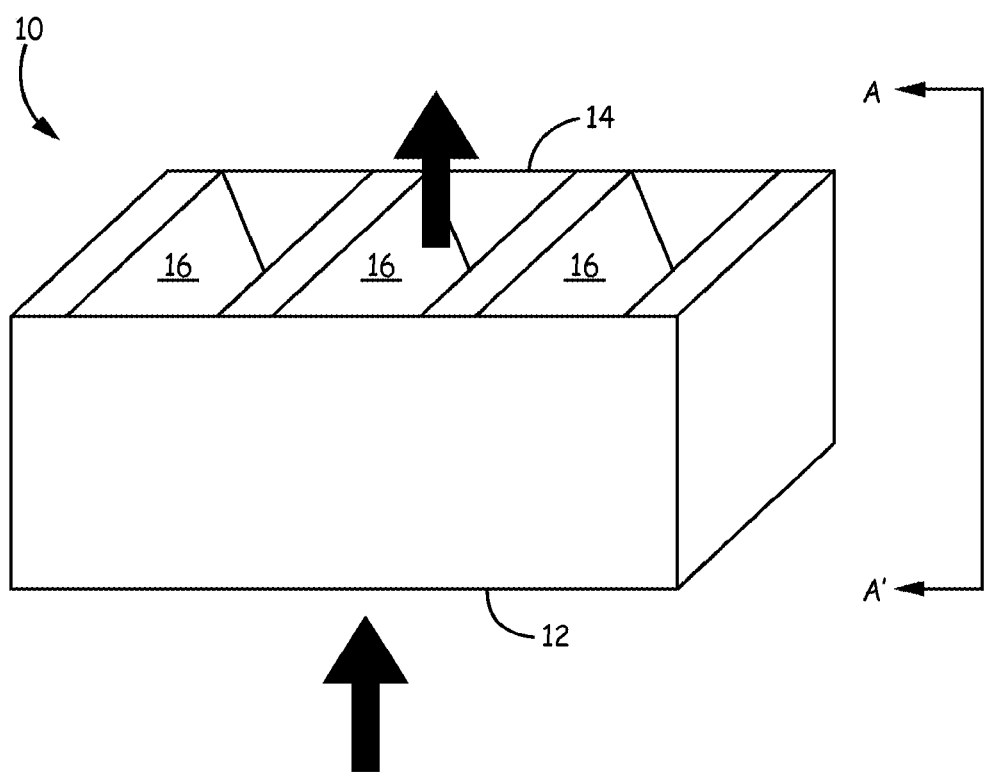
FIG. 1 is a perspective view of filter element made in accordance with an implementation of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION

The present invention is directed, in part, to method and materials for reducing siloxane contaminants in gases, optionally along with the reduction of other contaminants, such as bases/basic gases and acids/acidic gases. The method comprises, in certain embodiments, utilization of an adsorbent material that has been washed with an acid to reduce siloxane levels in the gas as the gas passes through the adsorbent. The invention is also directed to filter elements for reducing siloxane levels in a gas, the filter element comprising at least two adsorbents. The first adsorbent material comprises an acid-washed adsorbent; the second adsorbent material comprises an acid-impregnated adsorbent.

The methods and media can be used to remove siloxane contaminants from ambient air, as well as from clean dry air (CDA), nitrogen gas, and rare gases. The removal of siloxanes is often particularly important to semiconductor manufacturing, such as photolithography processes. The removal of siloxanes can also be important on the lithography track, metrology, and during inspection processes; as well is in other manufacturing processes. The removal of siloxanes, even siloxanes at very low concentrations, can also be beneficial in various microelectronics manufacturing process, such as production of computer displays, photonics, and photovoltaics.

In addition to the use of an acid washed adsorbent for the removal of siloxanes, additional adsorbent materials can be used in conjunction with the acid washed adsorbent to either further remove siloxanes, to remove other contaminants, or to remove siloxanes as well as other contaminants.

The invention is also directed, in part, to filtration system for reducing siloxane levels in a gas, the filtration system containing a first filter element comprising an adsorbent material, the first adsorbent material comprising an acid-washed adsorbent; and a second filter element comprising an adsorbent material, the second adsorbent material comprising an acid-impregnated adsorbent. The filter system is configured in a series for a majority of the gas to pass through the first filter element and then the second filter element.

The invention is further directed, in an alternative embodiment, to filtration system comprising a first filter element comprising an adsorbent material, the first adsorbent material comprising an acid-impregnated adsorbent; and a second filter element comprising an adsorbent material, the second adsorbent material comprising an acid-washed adsorbent. The filter system is configured in a series for a majority of the gas to pass through the first filter element and then the second filter element.

The invention is further directed, in part, to method of reducing siloxane levels in a gas, method comprising providing an adsorbent material that has been washed with an acid; and passing a gas through the adsorbent material so as to reduce siloxane levels in the gas. The invention is further directed, in part, to a method of reducing siloxane levels in a gas, the method comprising providing an adsorbent material that has been washed with a first acid and subsequently impregnated with a second acid; and passing a gas through the adsorbent material so as to reduce siloxane levels in the gas.

Adsorbent Materials

The additional adsorbent material can also include activated carbon, as well as silica gel, activated alumina, zeolites, nanoporous supports, and combinations thereof. In one implementation the additional adsorbent is impregnated with an acid, such as a strong acid. Suitable acids include, for example, phosphoric acid and citric acid. These acid impregnated adsorbents are particularly suitable for removal of basic contaminants, such as ammonia.

Typically the two adsorbents (such as an acid washed adsorbent in which most acid is removed, and acid impregnated adsorbents in which significant amounts of acid remain impregnated on the media) are configured so that gases sequentially flow through the different adsorbents, as opposed to mixing of the adsorbents together. Thus, for example in a packed-bed filter, there may be one bed for a first adsorbent, and second packed bed for the second adsorbent.

Besides the above-mentioned acid washed adsorbent for siloxane removal, and the acid impregnated adsorbent for removal of bases, other materials can be incorporated. These include, for example, acid gas removers that comprise adsorbent impregnated with bases, such as potassium iodide (KI) or potassium carbonate ($K_2CO_3$) or sodium hydroxide (NaOH). The acid gas remover can also further remove siloxanes. The ratio of acid washed adsorbent to acid gas remover is from 2:1 to 1:2; alternatively from 3:1 to 1:3; and alternatively from 4:1 to 1:4 in various example embodiments.

When acid treatment is used to modify the surface of the adsorbent, generally the acid treatment comprises treating the adsorbent material or substrate with a strong acid, often with an aqueous acid solution that is at least 5 percent by weight acid, more typically an aqueous acid solution that is at least 10 percent strong acid by weight. In certain implementations the acid treatment comprises treatment of the substrate in an acid solution that is at least 35 percent acid, and optionally a solution that is at least 70 percent acid. In some embodiments the acid solution comprises from 5 to 85 percent acid, in others the acid solution comprises from 20 to 75 percent acid, and yet others the acid solution comprises from 30 to 60 percent acid. Note that even greater than 85 percent acid can be added, typically by use of acid fumes or vapors.

In some implementations the aqueous acid solution comprises nitric acid, optionally at least 5 percent nitric acid, more typically at least 10 percent nitric acid. In certain implementations the acid solution comprises at least 35 percent nitric acid, and optionally at least 70 percent nitric acid. In some embodiments the acid solution comprises from 5 to 85 percent nitric acid, in others the acid treatment comprises from 20 to 75 percent nitric acid, and in yet others the acid solution comprises from 30 to 60 percent nitric acid.

Several acids can be used in this process such as, for example, nitric acid, phosphoric acid and sulfuric acid. Additional acids include, for example, citric acid and malonic acid. A single acid or a mixture, and a range of different acid concentrations, can be used. The treatment process can be done at static or dynamic conditions. Static conditions include, for example, soaking the adsorbent in an acid solution. Dynamic conditions include, for example, having the adsorbent mixed with the acid under stirring and/or rotary or orbital shaking.

Typically an amount of acid is used that is consistent with a particular mass-to-volume ratio of the adsorbent to the acid. Such mass-to-volume ratio depends on factors such as pore volume of the adsorbents, the origin of the adsorbent, and the bulk density of the adsorbent, for example, although other factors can also be relevant. Suitable volume-to-mass (ml/g) ratios include, for example, from 0.1 to 1, from 1 to 10, and from 10 to 100, in the case of activated carbon. The ratio of volume of acid-to-volume of pores per relative to unit mass of carbon include from 0.01 to 1, from 1 to 10, and from 10 to 100.

When acid washing is used to modify the surface of the adsorbent, generally the acid treatment comprises treating a substrate with a strong acid, often the acid is in an aqueous solution that is at least 5 percent strong acid by weight of the solution, more typically at least 10 percent strong acid by weight of the solution. In certain implementations the acid comprises at least 35 percent acid by weight of the solution, and optionally at least 70 percent acid by weight of the solution. In some embodiments the acid solution comprises from 5 to 85 percent acid by weight of the solution, in others the acid comprises from 20 to 75 percent acid by weight of the solution, and yet others the acid comprises from 30 to 60 percent acid by weight of the solution.

Treatment time also varies based on a variety of factors that include pore volume of the adsorbents, the origin of the adsorbent, and the bulk density of the adsorbent. The treatment time typically varies from a few minutes up to several days. In some implementations the surface treatment is up to 1 hour, in other implementations the surface treatment is up to 24 hours, and in yet other implementations the surface treatment is greater than 24 hours.

In various embodiments the absorbent can be used immediately after the acid treatment. In other embodiments the adsorbent is washed with water to remove a portion of the acid. In some such embodiments 1%-10% by weight of the acid may remain in the adsorbent, and sometimes from 1 to 20% by weight. In some of those embodiments 2%-7% of the acid may remain in the adsorbent. In at least one embodiment, 3%-5% of the acid remains in the adsorbent. The pH of the sample can be controlled by the amount of water used in the wash. In various embodiments the pH of the sample is slightly acidic. In at least one embodiment, the pH of the sample is between 4 and 5, in others the pH is from 3.5 to 6.5; and in yet other implementations the pH is from 3 to 7, while in other implementations the pH is from 2 to 8. Generally the amount of acidic groups will range from 0.1 to 10 mmol acidic groups per gram of carbon. In some implementations the amount of acidic groups will range from 1.0 to 10 mmol acidic groups per gram of carbon; in others from 1.0 to 5.0 mmol acidic groups per gram of carbon.

The invention is also directed, in part, to filtration system for reducing siloxane levels in a gas, the filtration system containing a first filter element comprising an adsorbent material, the first adsorbent material comprising an acid-washed adsorbent; and a second filter element comprising an adsorbent material, the second adsorbent material comprising an acid-impregnated adsorbent. The filter system is configured in a series for a majority of the gas to pass through the first filter element and the second filter element.

The invention is further directed, in an alternative embodiment, to filtration system comprising a first filter element comprising an adsorbent material, the first adsorbent material comprising an acid-impregnated adsorbent; and a second filter element comprising an adsorbent material, the second adsorbent material comprising an acid-washed adsorbent. The filter system is configured in a series for a majority of the gas to pass through the first filter element and the second filter element.

The invention is further directed, in part, to method of reducing siloxane levels in a gas, method comprising providing an adsorbent material that has been washed with an acid; and passing a gas through the adsorbent material so as to reduce siloxane levels in the gas.

The invention is further directed, in part, to a method of reducing siloxane levels in a gas, the method comprising providing an adsorbent material that has been washed with a first acid and subsequently impregnated with a second acid; and passing a gas through the adsorbent material so as to reduce siloxane levels in the gas. In some embodiments the first acid and second acid are different acids. The first acid can be, for example, nitric acid. The second acid generally comprises an acid other than nitric acid. The second acid can comprise, for example, citric acid.

Elements Containing Adsorbent Materials

In reference now to the drawings, FIG. 1 shows simplified view of a filter element for removing contaminants from a gas stream made in accordance with an implementation of the invention. The element 10 includes a bottom 12 and top 14. Gases flow from the bottom 12 through one or more layers of media pack 16 and then out the top 14 of the element 10 (as shown by the large arrows depicting general gas flow direction).

Figure 2:
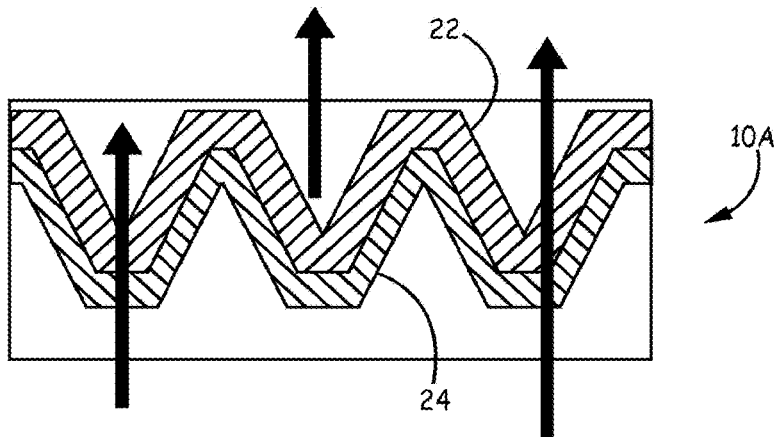
FIG. 2 is a cross sectional view of a first example filter element made in accordance with an implementation of the invention.
Figure 3:
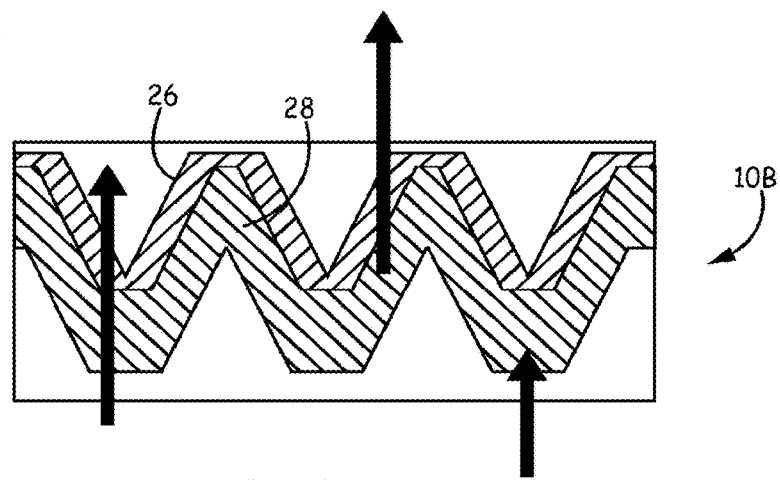
FIG. 3 is a cross sectional view of a second example filter element made in accordance with an implementation of the invention.
Figure 4:
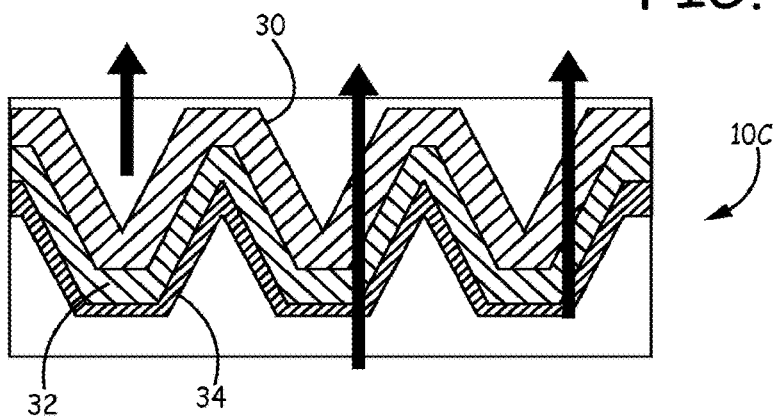
FIG. 4 is a cross sectional view of a third example filter element made in accordance with an implementation of the invention.

FIGS. 2, 3, and 4 show cross sections of alternative media pack configurations for elements such as element 10, taken along cross section A-A'. In FIG. 2 the element 10A has two layers 22, 24 of media. In the depicted embodiments the media layers (such as packed carbon beds) are substantially equal in volume. The lower layer 24 can comprise, for example, acid washed activated carbon to primarily remove siloxanes, while the upper layer 22 can contain phosphoric acid impregnated activated carbon to remove ammonia. Other materials can also be included, such as an acid gas remover, which can be blended with the adsorbents in the upper layer 22 and/or lower layer 24.

FIG. 3 shows an element 10B with a similar design to that of FIG. 2, but with a lower layer 28 containing significantly more media than upper layer 26. It will be understood that either layer can contain acid washed adsorbent, and either layer can contain acid impregnated adsorbent. However, generally a single layer would not contain both acid washed adsorbent and acid impregnated adsorbent (although such mixtures might be appropriate for some implementations). Also, it will be understood that the upper layer can have more adsorbent than the lower layer (and thus the layers 26, 28 can be reversed).

FIG. 4 shows yet another embodiment of a filter element 10C, this time with three media layers 30, 32, 34. The layers 30, 32, 34 can contain a variety of adsorbents as described herein. For example, they can contain one or more of acid washed adsorbents, acid impregnated adsorbents, acid gas removers, or other materials compatible with the reduction of contaminants from gases, in particular the reduction of siloxanes.

It will be understood that alternative configurations besides those shown in FIGS. 2, 3, and 4 are possible. For example, in some implementations the various adsorbent materials (such as acid washed carbon and acid impregnated carbon) can be blended together. In some implementations the various adsorbent materials are provided in a combination of blends and layered constructions whereby some layers are blended adsorbents, and some layers are non blended adsorbents.

Examples

Efficacy of various materials on the removal of siloxanes and ammonia was tested using a number of example media constructions. For the tests, air was flowed through an hexamethyldisilazane (HMDS) bubbler to generate trimethyl siloxane (TMS) and hexamethyldisiloxane (HMDSO) using a catalyst converter. Total siloxane concentration of the test gas was measured at 20 ppm, with an ammonia concentration measured at 10 parts per million. The gas was maintained at a temperature of 25 degrees Celsius, with a relative humidity of 50 percent. Flow rate of the gas was maintained so as to simulate a flow rate of 2,600 cubic meters per hour in a full size element. Contaminant levels were measured with Fourier transform infrared spectroscopy (FTIR).

Figure 5:
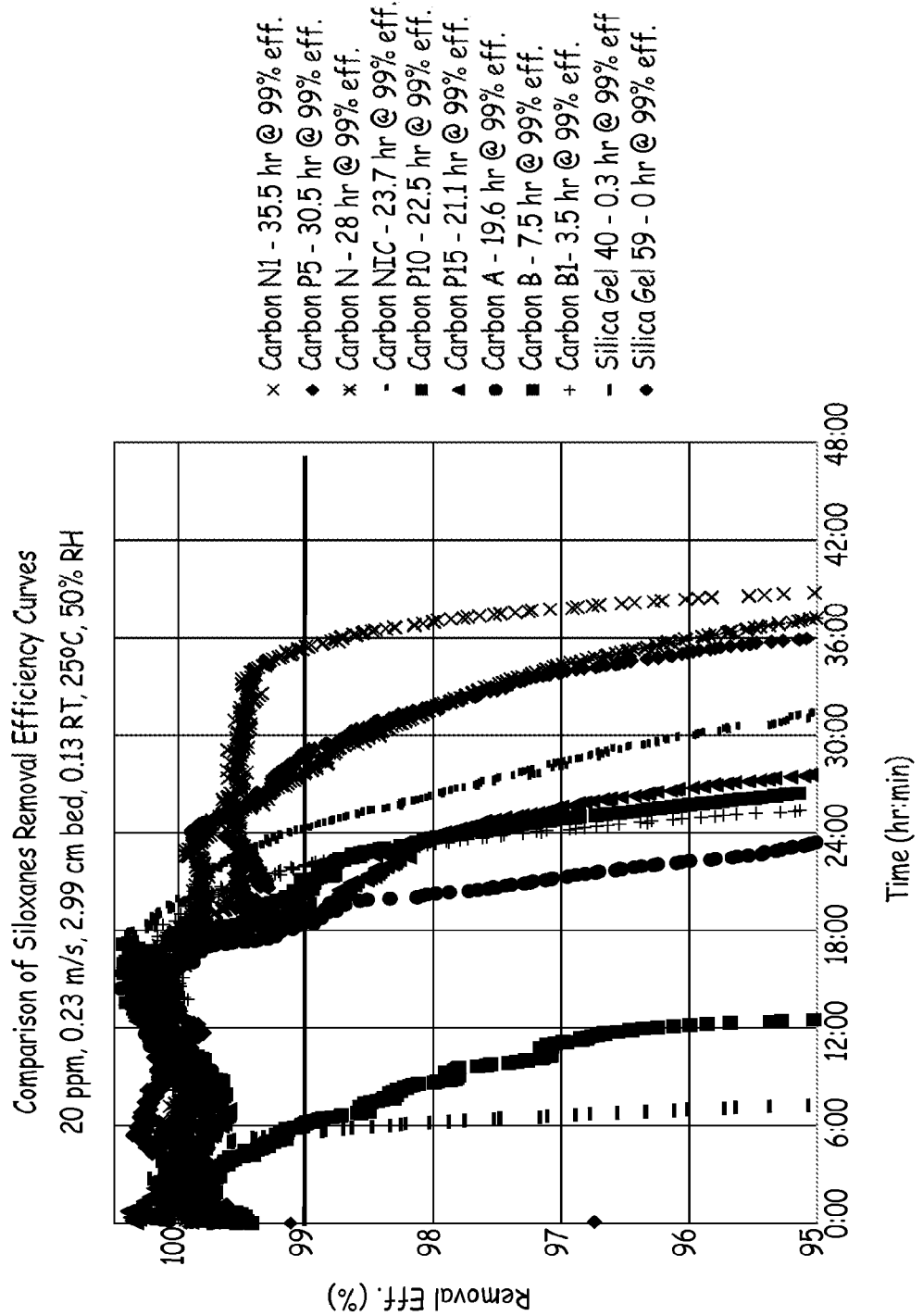
FIG. 5 is a chart showing siloxane removal from a gas stream using adsorbent media.
Figure 6:
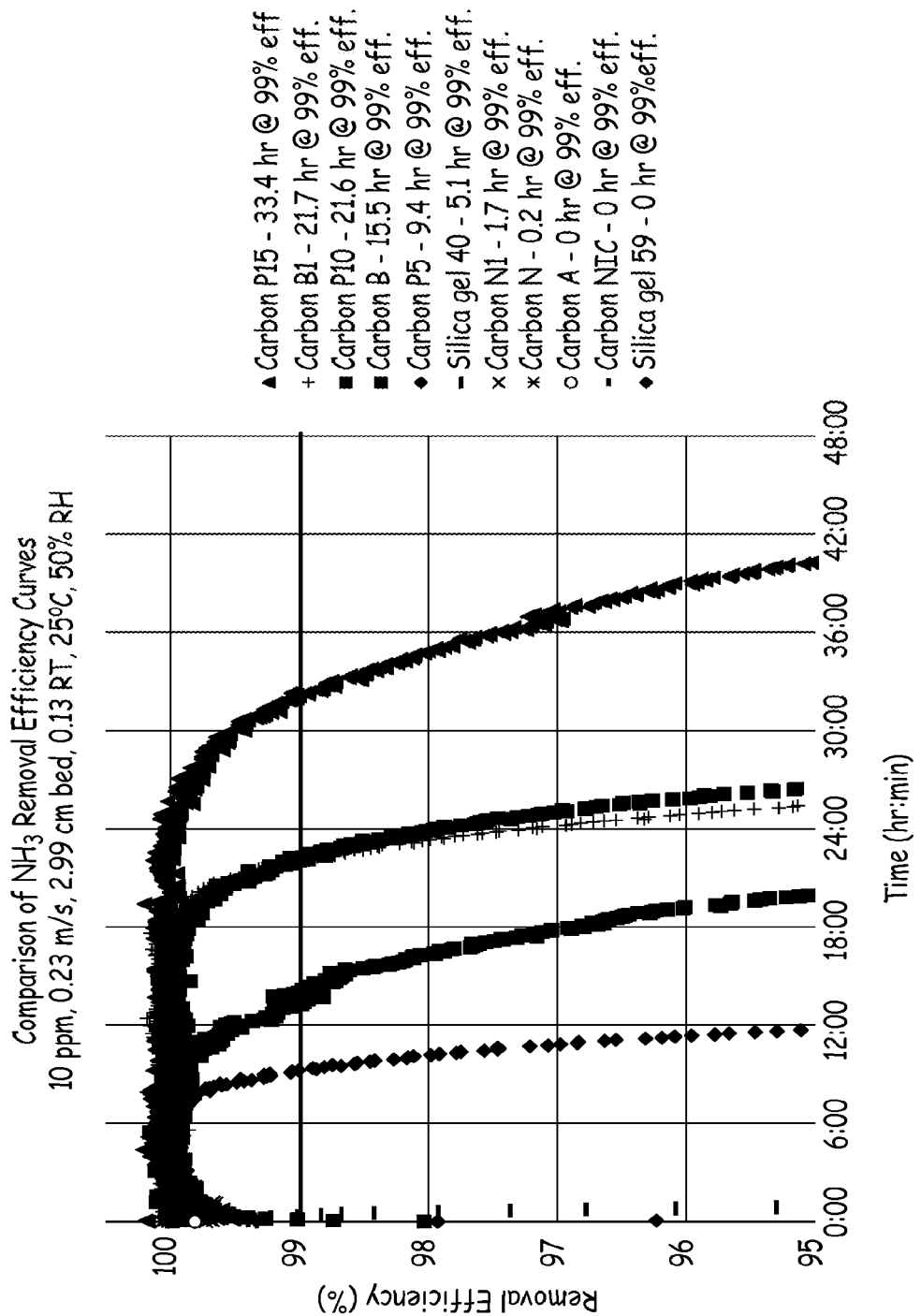
FIG. 6 is a chart showing ammonia removal from a gas stream using adsorbent media.

The following adsorbent materials were tested, as indicated on FIG. 5 and FIG. 6: Carbon A, which was activated carbon with an acid gas remover. Carbon B, which was citric acid impregnated carbon with an impregnation level of approximately 12 to 18 percent. Carbon B1, which was citric acid impregnated media with an impregnation level of approximately 35 percent. Carbon N, which was nitric acid washed carbon. Carbon N1, which was nitric acid washed carbon at a different mesh size. Carbon P15, which was 15% phosphoric acid impregnated carbon mesh. Carbon P15-1, which was 15% phosphoric acid impregnated carbon mesh. Carbon P10, which was 10% phosphoric acid impregnated carbon mesh. Carbon P10-1, which was 10% phosphoric acid impregnated carbon mesh. Carbon P5, which was 5% phosphoric acid impregnated carbon mesh. Carbon P5-1, which was 5% phosphoric acid impregnated carbon mesh. Carbon NIC, which was non-impregnated carbon. Silica Gel 40, which was a first silica gel, and silica Gel 59, which was a second silica gel. The materials shown in FIG. 5 and FIG. 6 were composed of materials which, in some instances, were of different mesh.

As is evident from FIG. 5, carbon treated with a nitric acid was shows excellent performance at removing siloxanes relative to other media materials. As is evident from FIG. 6, a variety of media constructions can be used for removing ammonia, including phosphoric acid impregnated carbon. These materials may be combined, in sequential flow paths, to produce a filter that removes both siloxanes and ammonia from a gas stream.

Figure 7:
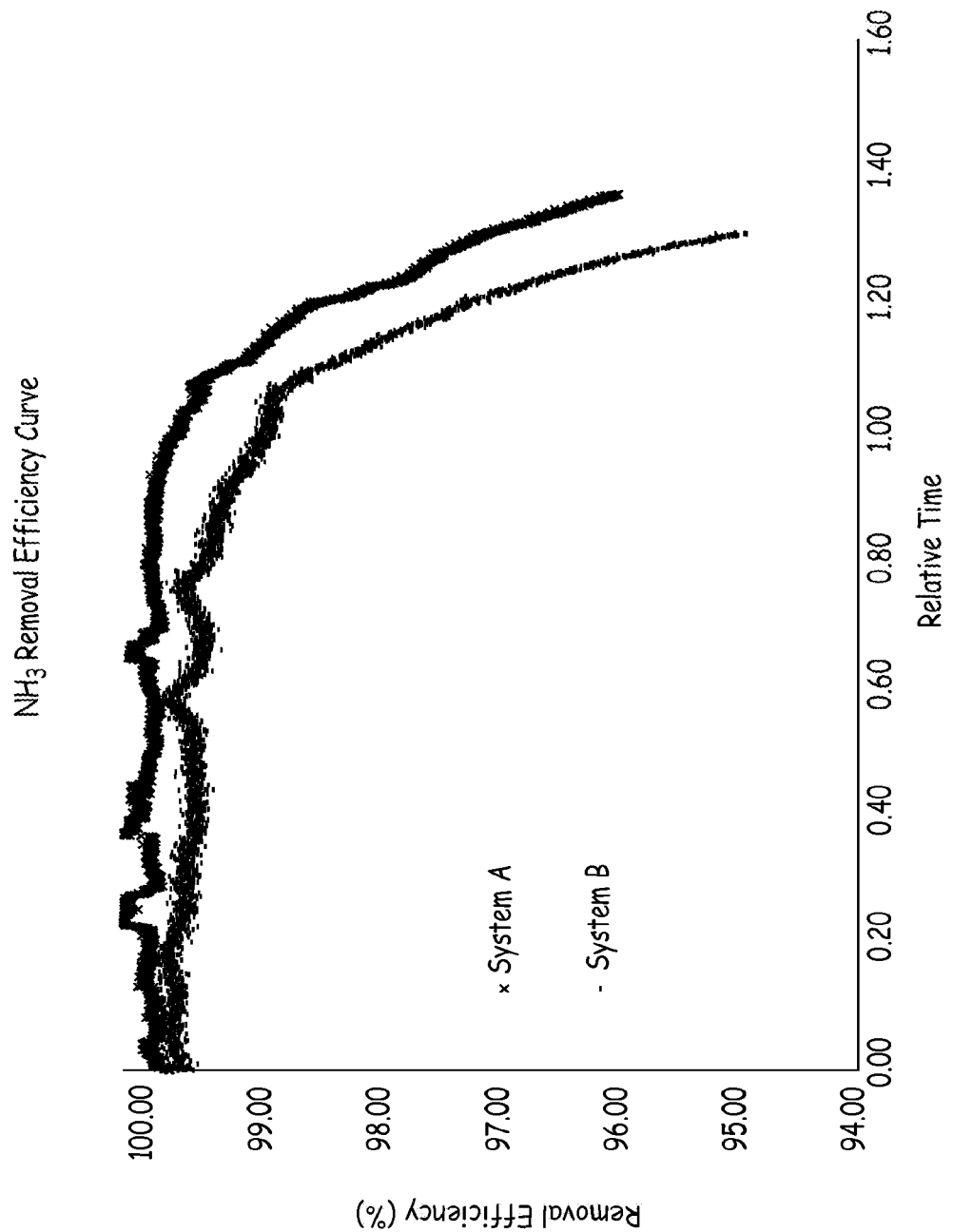
FIG. 7 is a chart showing ammonia removal efficiency from a gas stream using adsorbent media.

FIG. 7 is a chart showing an ammonia removal efficiency curve from a gas stream using adsorbent media, showing two different systems. System A was made in accordance with the present invention, and included Carbon A & Carbon P15-1 and Carbon N1 & Carbon P15-1. System B contained a first stage Carbon A & Carbon B, plus a second stage of Carbon A & Carbon B. Each system contained substantially the same amount of total carbon media. The test conditions were performed at 10 ppmV, 25 degrees C., 50 percent relative humidity, and 0.24 second retention time in the system. As shown in FIG. 7, System A performed better than System B in removal efficiency, demonstrating significantly longer effective removal periods of ammonia.

Figure 8:
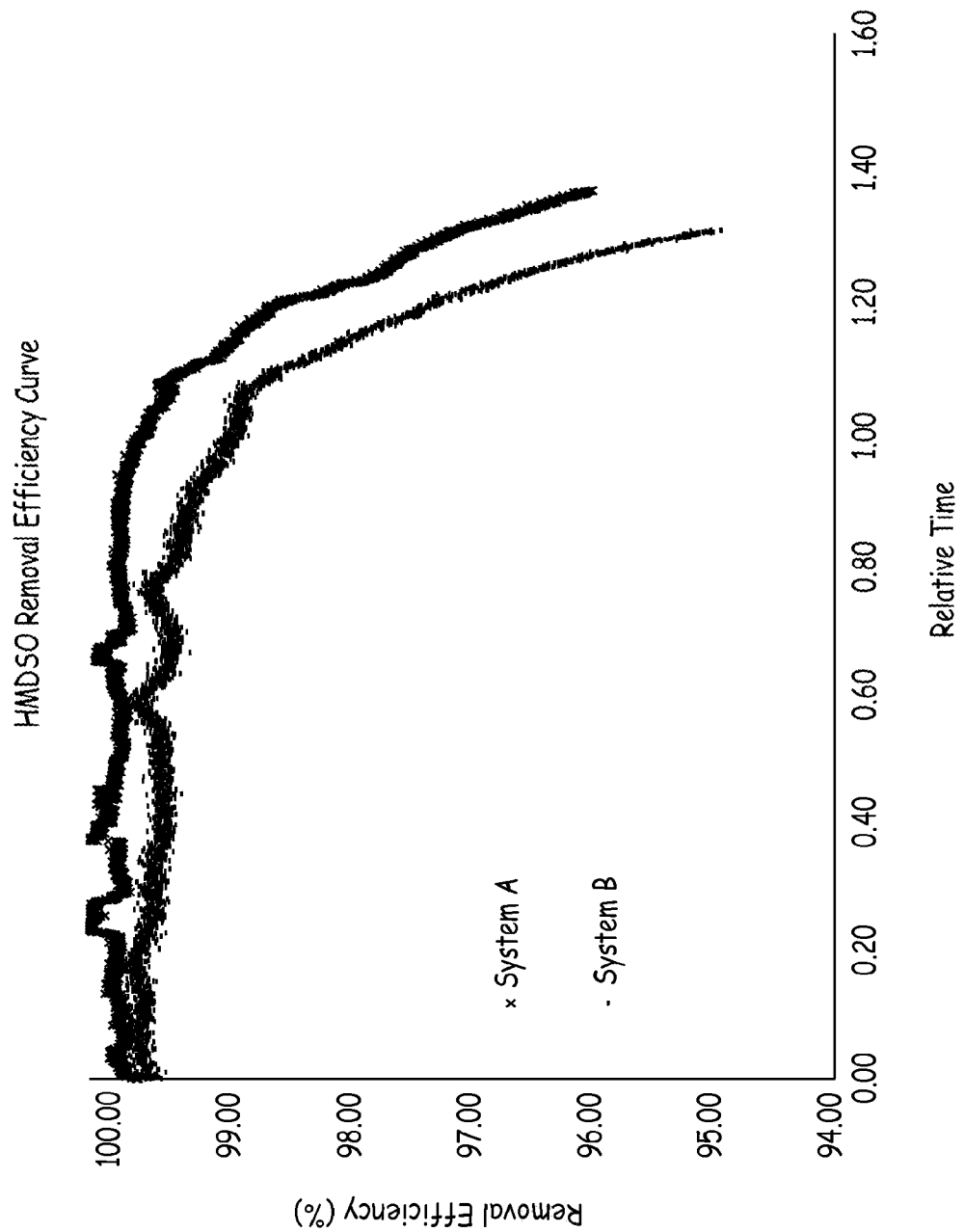
FIG. 8 is a chart showing hexamethyldisiloxane removal efficiency from a gas stream using adsorbent media.

FIG. 8 is a chart showing hexamethyldisiloxane removal efficiency curve from a gas stream using adsorbent media. System A was made in accordance with the present invention, and included Carbon A & Carbon P15-1 and Carbon N1 & Carbon P15-1. System B contained a first stage Carbon A & Carbon B, plus a second stage of Carbon A & Carbon B. Each system contained substantially the same amount of total carbon media. The test conditions were performed at 10 ppmV, 25 degrees C., 50 percent relative humidity, and 0.24 second retention time in the system. As shown in FIG. 8, System A performed better than System B in removal efficiency, demonstrating significantly longer effective removal periods of hexamethyldisiloxane.

Figure 9:
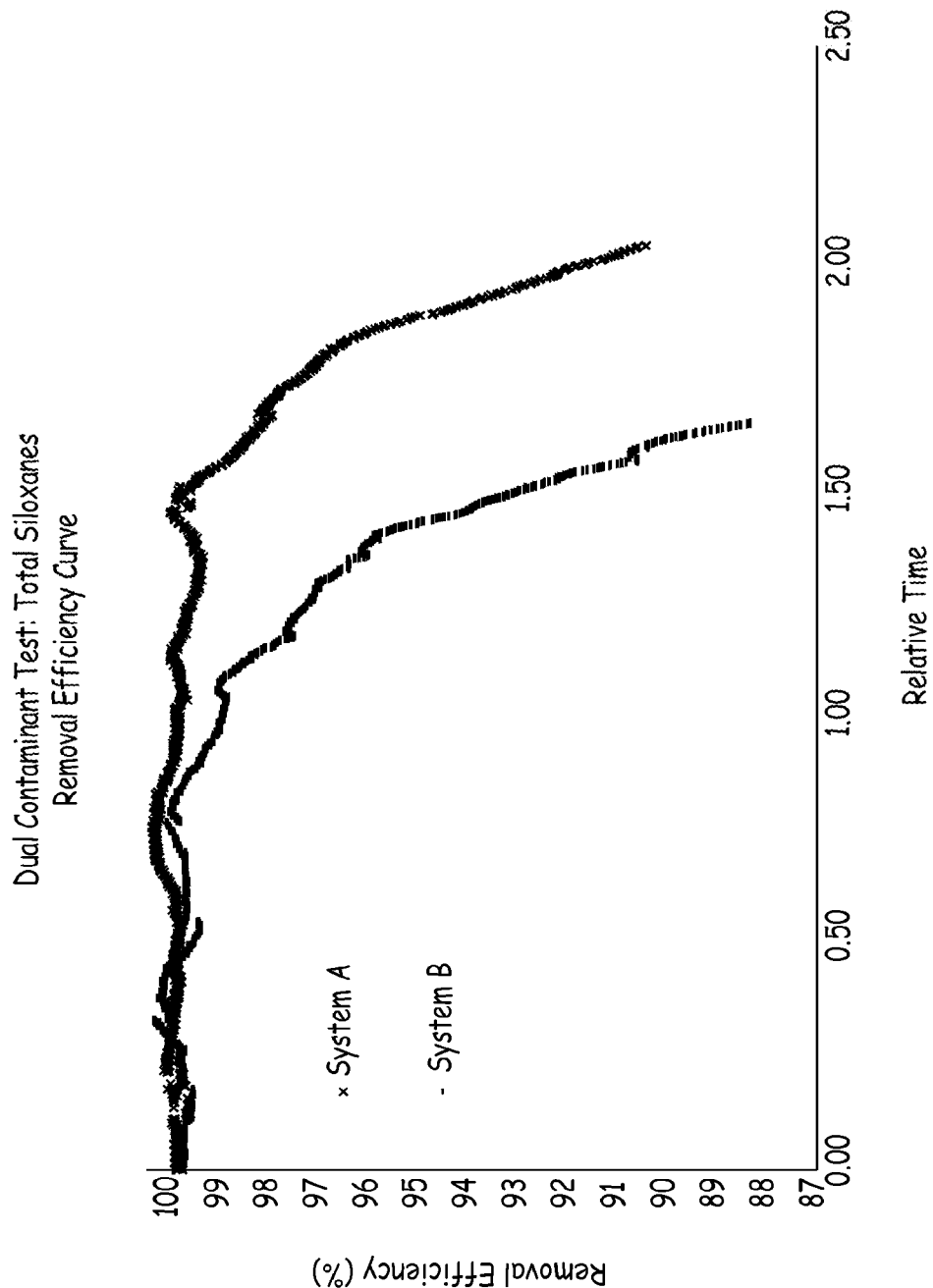
FIG. 9 is a chart showing total siloxane removal efficiency from a gas stream using adsorbent media.

FIG. 9 is a chart showing total a siloxane removal efficiency curve from a gas stream using adsorbent media. System A was made in accordance with the present invention, and included Carbon A & Carbon P15-1 and Carbon N1 & Carbon P15-1. Each system contained substantially the same amount of total carbon media. System B contained a first stage Carbon A & Carbon B, plus a second stage of Carbon A & Carbon B. The test conditions were performed at 20 ppmV, 25 degrees C., 50 percent relative humidity, and 0.24 second retention time in the system. As shown in FIG. 9, System A performed better than System B in removal efficiency, demonstrating significantly longer effective removal periods of total siloxanes.

Figure 10:
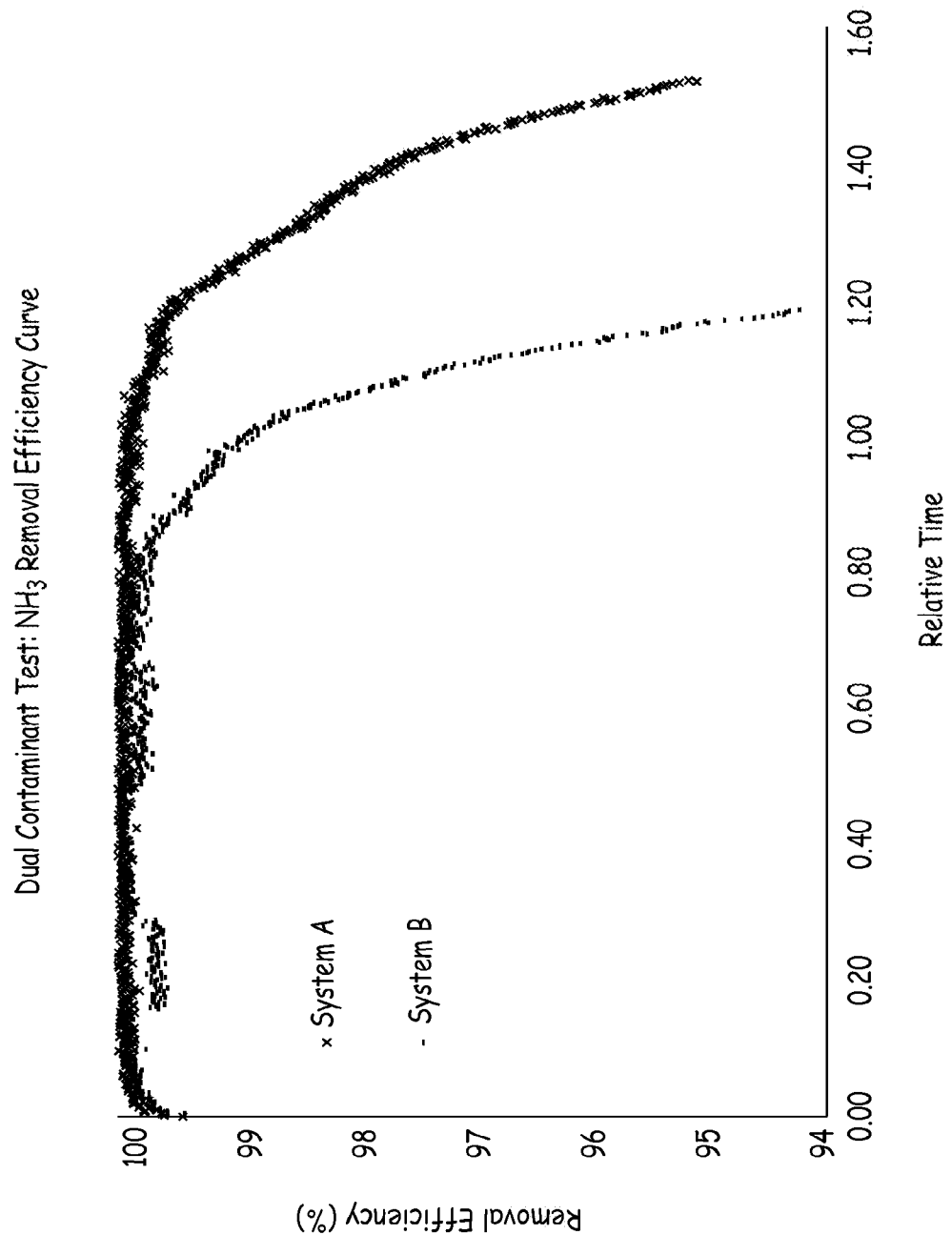
FIG. 10 is a chart showing total ammonia removal efficiency from a gas stream using adsorbent media.

FIG. 10 is a chart showing a total ammonia removal efficiency curve from a gas stream using adsorbent media. System A was made in accordance with the present invention, and included Carbon A & Carbon P15-1 and Carbon N1 & Carbon P15-1. Each system contained substantially the same amount of total carbon media. System B contained a first stage Carbon A & Carbon B, plus a second stage of Carbon A & Carbon B. The test conditions were performed at 10 ppmV, 25 degrees C., 50 percent relative humidity, and 0.24 second retention time in the system. As shown in FIG. 10, System A performed better than System B in removal efficiency, demonstrating significantly longer effective removal periods of ammonia.

While the present invention has been described with reference to several particular implementations, those skilled in the art will recognize that many changes may be made hereto without departing from the spirit and scope of the present invention.

We claim:

1. A method of filtering a gas comprising siloxane and ammonia, the method comprising:
   providing a filter element comprising:
   a first adsorbent material, wherein the first adsorbent material comprises means for removal of an acid gas;
   a second adsorbent material, wherein the second adsorbent material comprises means for removal of a basic contaminant;
   a third adsorbent material, wherein the third adsorbent material comprises a means for removal of siloxanes; and
   passing the gas through the filter element to reduce siloxane and ammonia levels in the gas, wherein the gas passes sequentially through the first adsorbent material, then the second adsorbent material, and then the third adsorbent material.

2. The method of claim 1, wherein each adsorbent material comprises activated carbon, silica gel, activated alumina, zeolites, or a nanoporous support, or a combination thereof.

3. The method of claim 1, wherein a pH of the third adsorbent material is from 3 to 7.

4. The method of claim 1, wherein the third adsorbent material comprises an activated carbon that has been acid-washed.

5. The method of claim 1, wherein the third adsorbent material comprises an activated carbon that has been acid-washed with nitric acid.

6. The method of claim 1, wherein the second adsorbent material is impregnated with a strong acid.

7. The method of claim 6, wherein the strong acid comprises phosphoric acid, nitric acid, sulfuric acid, malonic acid, or citric acid, or a combination thereof.

8. The method of claim 1, wherein the filter element further comprises a fourth adsorbent material, wherein the fourth adsorbent material is impregnated with a strong acid, and wherein the gas passes through the first adsorbent material, the second adsorbent material, and the third adsorbent material, and then subsequently passes through the fourth adsorbent material.

9. The method of claim 1, wherein the means for removing an acid gas comprises an adsorbent impregnated with at least one of potassium iodide (KI), potassium carbonate ($K_2CO_3$), and sodium hydroxide (NaOH).

* * * * *